(12) United States Patent
Munoz

(10) Patent No.: US 11,736,808 B2
(45) Date of Patent: Aug. 22, 2023

(54) HIGH-POWERED WIRELESS LED-BASED STROBE FOR STILL AND MOTION PHOTOGRAPHY

(71) Applicant: Alex Munoz, Reseda, CA (US)

(72) Inventor: Alex Munoz, Reseda, CA (US)

( * ) Notice: Subject to any disclaimer, the term of this patent is extended or adjusted under 35 U.S.C. 154(b) by 561 days.

(21) Appl. No.: 16/450,651

(22) Filed: Jun. 24, 2019

(65) Prior Publication Data

US 2020/0401015 A1 Dec. 24, 2020

(51) Int. Cl.
*H04N 23/74* (2023.01)
*G03B 15/05* (2021.01)
*H05B 45/00* (2022.01)
*H05B 47/19* (2020.01)
*H04N 23/56* (2023.01)
*H04N 23/66* (2023.01)
*H04N 23/661* (2023.01)

(52) U.S. Cl.
CPC ............. *H04N 23/74* (2023.01); *G03B 15/05* (2013.01); *H04N 23/56* (2023.01); *H04N 23/66* (2023.01); *H04N 23/662* (2023.01); *H05B 45/00* (2020.01); *H05B 47/19* (2020.01); *G03B 2215/0557* (2013.01)

(58) Field of Classification Search
CPC ............... H04N 5/2256; H04N 5/2354; H04N 5/23203; H04N 23/56; H04N 23/66; H04N 23/662; H04N 23/74; G03B 15/05; G03B 15/041; G03B 2215/0557
See application file for complete search history.

(56) References Cited

U.S. PATENT DOCUMENTS

| | | | | |
|---|---|---|---|---|
| 4,201,434 A | * | 5/1980 | Tureck | G03B 15/05 439/502 |
| 5,446,512 A | * | 8/1995 | Mogamiya | G03B 17/38 396/155 |
| 7,035,534 B2 | * | 4/2006 | Shih | G03B 7/08 356/218 |
| 7,046,292 B2 | * | 5/2006 | Ziemkowski | H04N 5/247 348/371 |
| 7,139,472 B2 | * | 11/2006 | Yamazaki | G03B 7/16 396/56 |
| 7,358,657 B2 | * | 4/2008 | Koelger | H01J 61/86 359/838 |
| 8,116,620 B2 | * | 2/2012 | King | G03B 17/00 396/56 |
| 8,160,435 B2 | * | 4/2012 | Okubo | G03B 15/05 396/56 |
| 8,189,059 B2 | * | 5/2012 | Nozaki | H04N 1/2125 348/211.3 |

(Continued)

FOREIGN PATENT DOCUMENTS

DE 2715337 A * 10/1978

*Primary Examiner* — Quan Pham
(74) *Attorney, Agent, or Firm* — Chen-Chi Lin

(57) ABSTRACT

A multifunctional, wireless, high power LED-based strobe for still and motion photography is disclosed. The device is comprised of an LED lamp having a touch screen, onboard microcontroller, radio wave transmitter and receiver as well as a remote 'hot shoe' The invention is designed to be used with conventional still cameras and movie cameras. An object of the disclosure is to provide a means of customizing lighting conditions manually, automatically and in real time. Several proprietary lamps can also be tailored and controlled by the device.

7 Claims, 4 Drawing Sheets

(56) References Cited

U.S. PATENT DOCUMENTS

| | | | | |
|---|---|---|---|---|
| 8,195,040 B2* | 6/2012 | Shirakawa | H04B 7/26 | 396/56 |
| 8,224,170 B2* | 7/2012 | King | G03B 15/05 | 396/56 |
| 8,442,394 B2* | 5/2013 | Shirakawa | H04B 7/26 | 396/56 |
| 8,571,400 B2* | 10/2013 | King | G03B 15/05 | 396/56 |
| 8,577,215 B2* | 11/2013 | Shirakawa | H04N 5/2256 | 396/56 |
| 8,824,881 B2* | 9/2014 | Li | H05B 47/19 | 396/155 |
| 8,837,930 B2* | 9/2014 | Shirakawa | H04N 5/2256 | 396/56 |
| 8,854,536 B2* | 10/2014 | Ogasawara | G03B 15/05 | 348/371 |
| 8,860,843 B2* | 10/2014 | Mate | H04N 5/243 | 348/224.1 |
| 8,994,876 B2* | 3/2015 | Spielberg | H04N 5/23203 | 348/370 |
| 9,001,226 B1* | 4/2015 | Ng | H04N 5/23203 | 348/211.11 |
| 9,031,397 B2* | 5/2015 | Shirakawa | H04N 5/2256 | 396/56 |
| 9,185,305 B2* | 11/2015 | Ogasawara | G03B 15/03 | |
| 9,400,413 B2* | 7/2016 | Yamashita | G03B 15/03 | |
| 9,525,812 B2* | 12/2016 | Watanabe | G03B 15/05 | |
| 10,136,042 B2* | 11/2018 | Hamada | G03B 15/05 | |
| 10,264,169 B2* | 4/2019 | Leip | H04N 5/23206 | |
| 10,386,701 B1* | 8/2019 | Liang | G03B 15/05 | |
| 10,735,666 B2* | 8/2020 | Suzuki | G03B 15/05 | |
| 2004/0150724 A1* | 8/2004 | Nozaki | H04N 5/232123 | 348/211.4 |
| 2005/0225959 A1* | 10/2005 | Pohlert | H04N 5/2354 | 362/3 |
| 2005/0243198 A1* | 11/2005 | Pardikes | G03B 15/05 | 348/370 |
| 2005/0281549 A1* | 12/2005 | Shih | G03B 7/08 | 396/57 |
| 2009/0196595 A1* | 8/2009 | Okubo | G03B 15/05 | 396/175 |
| 2011/0280561 A1* | 11/2011 | Geffert | H04N 5/235 | 396/164 |
| 2012/0033959 A1* | 2/2012 | King | G03B 15/05 | 396/157 |
| 2012/0044371 A1* | 2/2012 | King | H04N 5/2256 | 348/211.2 |
| 2012/0044374 A1* | 2/2012 | Pohlert | H04N 5/2256 | 348/220.1 |
| 2012/0045193 A1* | 2/2012 | King | G03B 15/05 | 396/56 |
| 2012/0287296 A1* | 11/2012 | Fukui | G03B 31/00 | 348/E5.042 |
| 2013/0050510 A1* | 2/2013 | Fujihashi | H04N 23/66 | 348/207.1 |
| 2013/0120636 A1* | 5/2013 | Baer | H04N 5/2354 | 348/335 |
| 2013/0194440 A1* | 8/2013 | Koike | H04N 5/23206 | 348/207.1 |
| 2014/0099091 A1* | 4/2014 | King | G03B 15/05 | 396/157 |
| 2014/0168459 A1* | 6/2014 | Spielberg | H04N 5/23203 | 348/222.1 |
| 2014/0293013 A1* | 10/2014 | Gong | H04N 21/4788 | 348/47 |
| 2014/0362246 A1* | 12/2014 | Nakano | H04N 5/232061 | 348/211.4 |
| 2015/0008847 A1* | 1/2015 | Li | G03B 15/05 | 315/294 |
| 2015/0036042 A1* | 2/2015 | Umehara | G03B 15/05 | 348/371 |
| 2015/0312553 A1* | 10/2015 | Ng | H04N 23/74 | 348/47 |
| 2015/0334258 A1* | 11/2015 | O'Neill | H04N 1/00307 | 348/207.1 |
| 2016/0065826 A1* | 3/2016 | Chan | H04N 5/23203 | 348/211.2 |
| 2016/0077422 A1* | 3/2016 | Wang | H04N 5/23206 | 348/38 |
| 2017/0280030 A1* | 9/2017 | Leip | H04N 5/2256 | |
| 2019/0068854 A1* | 2/2019 | Munoz | H04N 5/23203 | |
| 2019/0163037 A1* | 5/2019 | Koyama | B64D 47/08 | |
| 2019/0178479 A1* | 6/2019 | Liu | G03B 15/02 | |
| 2019/0316768 A1* | 10/2019 | Saito | F21V 29/503 | |
| 2021/0003905 A1* | 1/2021 | Tolan | H05B 45/14 | |
| 2021/0165302 A1* | 6/2021 | Takano | H04N 23/74 | |

* cited by examiner

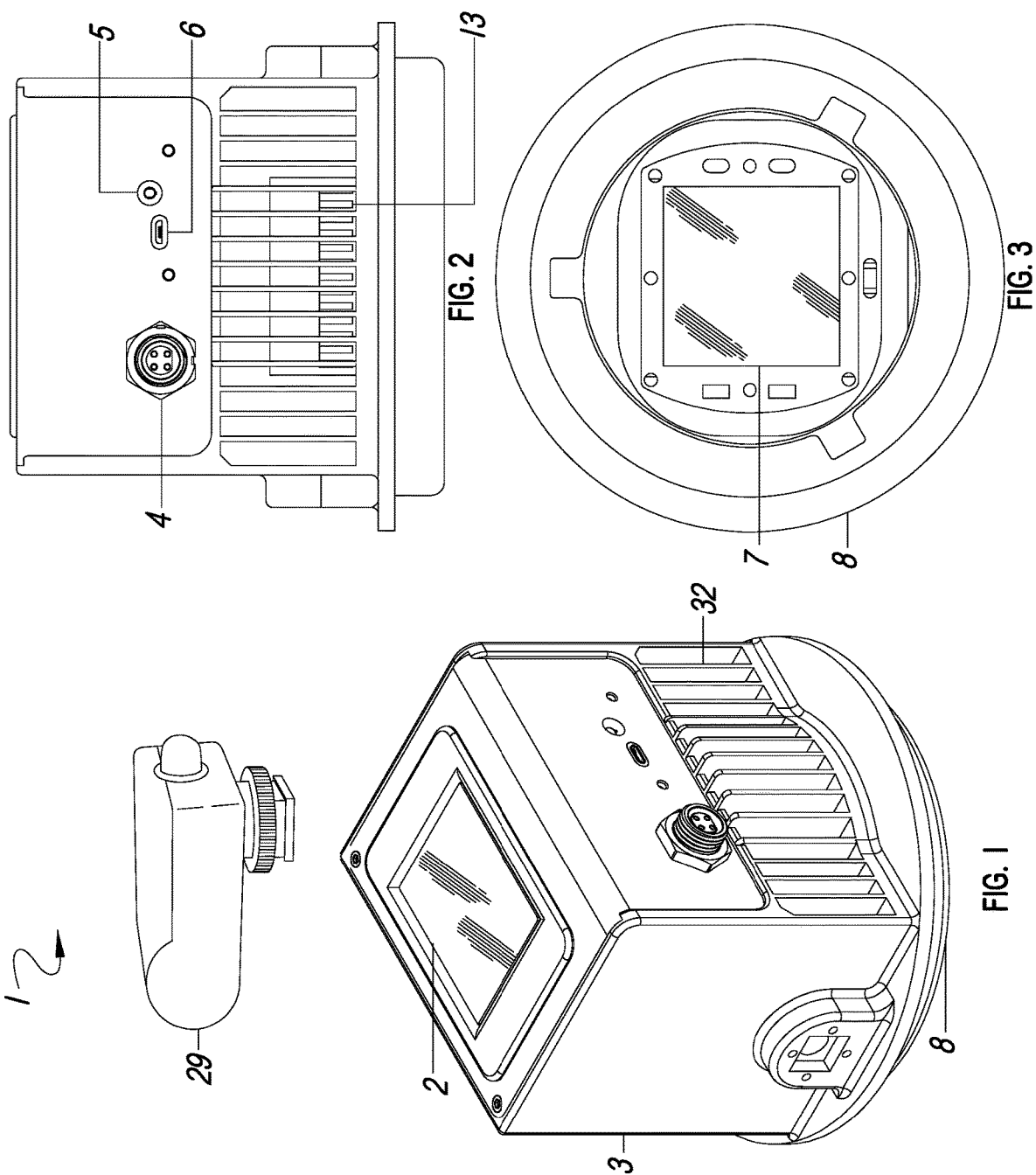

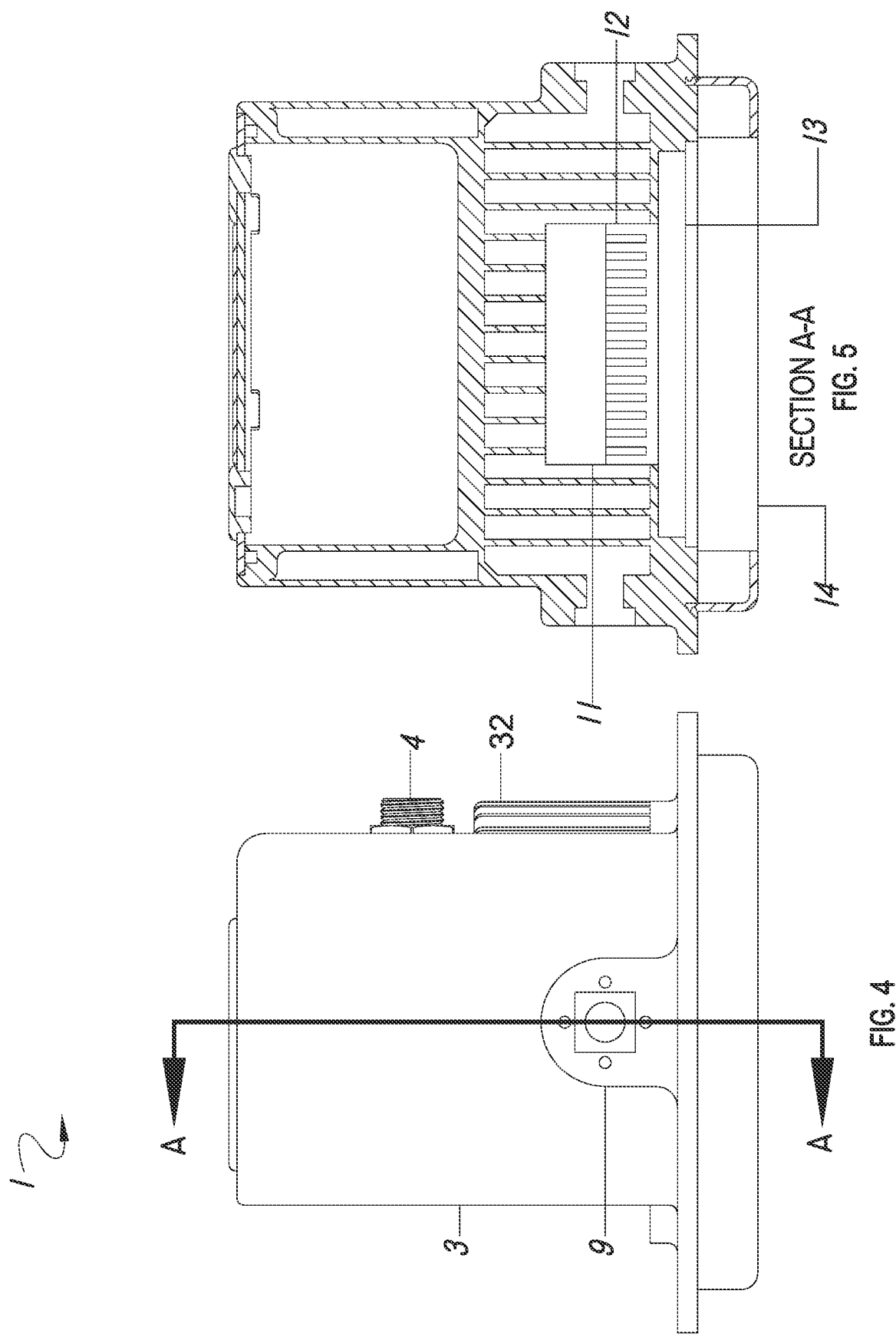

HIGH-POWERED WIRELESS LED-BASED STROBE FOR STILL AND MOTION PHOTOGRAPHY

FIELD OF THE INVENTION

The present invention generally relates to LED lighting systems. More specifically, it relates to a multifunctional, wireless, LED-based strobe for still and motion photography.

BACKGROUND

Early strobe lights for flash photography began with flash powders made of magnesium and potassium chlorate and while these materials created quick flashes for high shutter speeds—they were hazardous. In the early 1900s a french zoologist invented the flash bulb made up of a glass bulb with aluminum shards and filled with oxygen. In late 1950s electronic, rechargeable flash strobes using xenon gas were introduced. With the advent of digital imaging, LEDs and microcontrollers, lighting has undergone significant improvements. Photographers and technology experts have been inventing ways to manipulate and enhance lighting effects. U.S. Pat. No. 8,203,641 granted to Mori disclosed a display processing apparatus to set auto bracketing values in a camera. This disclosure is generally related to exposure bracketing controlled by the camera's shutter speed, aperture. It does not account for flash bracketing. This patent does not allow for multiple bracketing schema over the same time period. U.S. Pat. No. 9,250,499B2 granted to Clark disclosed a camera 'hot shoe' adapter to relay informality wirelessly to a remote strobe. It provides only limited exposure modifications to the strobe. United States Patent No. 20050174473A1 granted to Morgan disclosed strobe lights with features that allow for the creation of particular moods or a desired saturation or hue; however, it is focused on enhancing saturation through light modification but not through the flash duration, otherwise modulating the LED signal. United States Patent No. 20120044374 granted to Pohlert and others, disclosed a smart strobe panel that uses LEDs, but not integrate on-board processor to control the LED module. Furthermore, the battery must attach to the outside of the frame unit, whereas in the present disclosure, the power supply is neither limited to a battery, nor does it attach to the light housing directly. In addition it appears unable to control the strobe duration, intensity, shape, pattern or perform modulation. United States Patent No. 20070248342 granted to Tamminen and Perala disclosed a smart lighting system with rudimentary parameters controlled by software. This disclosure uses LEDs to illuminate a subject and measure its reflectance in order to calculate exposure for the camera more accurately; however, it is not meant to specifically to illuminate a subject United States Patent No. 20130147986 granted Chen disclosed an image capture method with auto exposure control that uses an image to calculate exposure, whereas the current disclosure assists exposure calculations for an external light condition. United States Patent No. 20090136224 granted to Aoyagi disclosed a sensor that detects the amount of light reflected back from the photographic subject. This disclosure does not modulate the light power signal, change the power for multiple light sources.

U.S. Pat. No. 8,571,400 granted to King disclosed a lighting system that requires the use of a camera which acquires image information such as exposure information) and then transmits that information to the remote controller. King does not patent a light source or technology but merely a system for interpreting and modifying information provided by the camera. Without receiving the information first from the camera, the King patent makes no claims of any functionality. The sole purpose of the King patent and all of its claims are based on the assumption that a camera makes information available that the proposed King controller can store, adjust, modify, or withhold in order to provide a variety of functions to photographers, such as individual exposure compensation. For example, King makes no claims for adjusting the intensity of the photographic flash during the flash discharge (intensity modulation during discharge), which is one of the claims in the Ser. No. 15/686,647 utility patent application. The invention thereof lies in the ability of the Master high-powered LED lamp to direct other lamps without the need for receiving any data from the camera first. Unlike the King invention and similar remote flash control systems, all of the claims the invention disclosed in this utility patent application discussed herein does not require input from the camera to make calculations. The claimed invention can either direct other lamps during the exposure process to freely adjust their output, frequency, or light modulation, serve as a single lamp to make these adjustments autonomously, or take information from other participating lamps and controllers in the exposure group to make adjustments before, during, and after an exposure without the need to process any input from a camera (unlike King which requires camera input first). In addition, King does not include LED flash technology in their claims and could not have conceivably done so, because this technology did not exist for professional photography at that time.

While there are LED-based flash systems manufacturers use to illuminate close objects and subjects in smartphone photography applications, these LED's are merely simple LED bulbs that are switched on for some time to add light and to enable the smartphone camera to use a lower ISO or faster shutter speed as otherwise possible. These LED implementations are orders of magnitudes less powerful than the claimed invention and do not offer modulation, synchronization between devices, or other more advanced features a professional photographer may need when they refer to professional flash photography. This is one of the reasons why all current flash technologies used by professional photographers rely on high voltage discharge lamps to illuminate the objects and subjects, a technology which has been in use for many decades. As claimed by King, these photographic flashlights (or strobes) are used by photographers when a large amount of light is required to illuminate a scene. At the time of the King patent writing, high voltage discharge lamps were the only suitable technology that could provide enough light output to achieve the desired results. Until today there are no commercially available products that are LED-based that could do the same for photographers, so the King patent could not have conceivably meant to include these technologies, especially because they are not explicitly mentioned in this context. Furthermore, one key tenet of the claimed invention is the use of high-powered LED-based lighting as a light source for professional still and motion photography, requiring technologies that are neither in use by smartphone LED-based flash systems, nor are they used for professional LED-light-based photography or videography. For example, while King does not claim that his invention could modulate the flash signal during exposure, doing so would likely be technically impossible with traditional discharge-based technology. Therefore, King could not have conceivably assumed similar functionality (and also does not claim in their patent) as is claimed by me, regardless of whether LED or discharge lamps are the primary source for illumination. Lastly, even when one considers LED-based lighting technologies as a means for illuminating a scene in motion applications, existing technologies are unable to modulate the output freely, automatically, or controlled by software in a pre-defined pattern. Existing technologies can control the light intensity of the LED-based lighting, usually through remote control or a setting on the lighting fixture, but they are unable to coordinate modulation among a variety of LED-based lamps during exposure or adjust power intensity automatically to meet exposure requirements without any input from the operator or the attached camera. Lastly, the King patent is solely focused on modifying existing camera signals to adjust the light output prior to exposure for still photography applications, and only still photography applications. King relies on pre-flashes and camera data exclusively for all of their claims, something this new invention can do without while also offering all of its functionality for still and motion photography.

While many of these inventions have begun to fine-tune various lighting characteristics, none were found in the prior art that utilize a network-approach to incorporate a multitude of strobes that interact with specific camera operations. The current disclosure addresses limitations in the prior art by offering an almost infinite combination of LED power and duration adjustment, nodulation, and programmable light shape pattern, all accessible by the user through an interface.

SUMMARY OF THE INVENTION

The device herein disclosed and described provides a solution to the shortcomings in the prior art through the disclosure of a multifunctional, wireless, LED-based strobe for still and motion photography. An object of the invention is to provide photographers and filmmakers with the ability to adjust a plurality of lighting parameters across a range of lights and cameras using a single 'master lamp.' This master lamp is generally comprised of a large LED, a touch screen interface, an internal microcontroller, onboard memory and a radio transmitter and receiver.

Another object of the invention is to leverage camera setting (such as, but not limited to: shutter speed, ISO sensitivity and Aperture) into the strobe adjustment process. These settings are transferred from a camera to the master lamp's controller by means of either a radio transmission sent from a hot shoe transmitter mounted on the camera's strobe adaptor or a cable connection.

Another object of the aforementioned invention is to provide a means for customizing light parameters for a multitude of lamps. The master lamp can communicate with several proprietary satellite lamps using the onboard radio transmitter that is controlled by an internal microprocessor attached to a touch screen that allows a user to select various lights and lighting conditions such as duration, modulation and intensity.

Another object of the invention is to provide an increase in the dynamic range of a an image using lighting methods. When filming a subject with highlights and shadows, conventional cameras increase dynamic range by taking several shots with different light settings (known as bracketing) because the strobe needs to recharge. The current disclosure uses a microprocessor to control light levels instantaneously allowing for bracketing to take place in successive shots and through variation of the power output levels of the LED-based strobe instead of shutter speed or aperture as is common with all other systems available today.

Another object of the invention is to provide a means to control strobe emission shapes and patterns. Firmware in the microprocessor allows power to the lamps to be modulated and controlled and preset via the touch screen or a remotely connected control device, such as a tablet, smartphone, or personal computer, for example, to generate a variety of light profile signatures. Photographers can use these light profile signatures to create unique images impossible to achieve with other lighting solutions or to digitally watermark the media they create.

Another object of the invention is to enhance 'through the lens metering.' In conventional cameras, a pre-flash takes place when a photographer presses the shutter button and relays proper flash setting information to the camera's image sensor within microseconds. After the preflash, the proper exposure is set, the shutter is opened and the picture is recorded. The current disclosure provides a constant pre-flash that does not delay the shutter opening process during a shoot and also allows for an image preview or in some cases in-camera metering processes to take place without intervention from the camera to the strobe and vice versa.

It is briefly noted that upon a reading this disclosure, those skilled in the art will recognize various means for carrying out these intended features of the invention. As such it is to be understood that other methods, applications and systems adapted to the task may be configured to carry out these features and are therefore considered to be within the scope and intent of the present invention, and are anticipated. With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and caned out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention. As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

The objects features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF THE FIGURES

The accompanying drawings, which are incorporated herein and form a part of the specification, illustrate some, but not the only or exclusive, examples of embodiments and/or features. It is intended that the embodiments and figures disclosed herein are to be considered illustrative rather than limiting. In the drawings:

FIG. 1 is a perspective view of the invention.
FIG. 2 is a front view of the invention.
FIG. 3 is a bottom view of the invention.
FIG. 4 is a side view of the invention.
FIG. 5 is a section view of the invention

Figure 6:
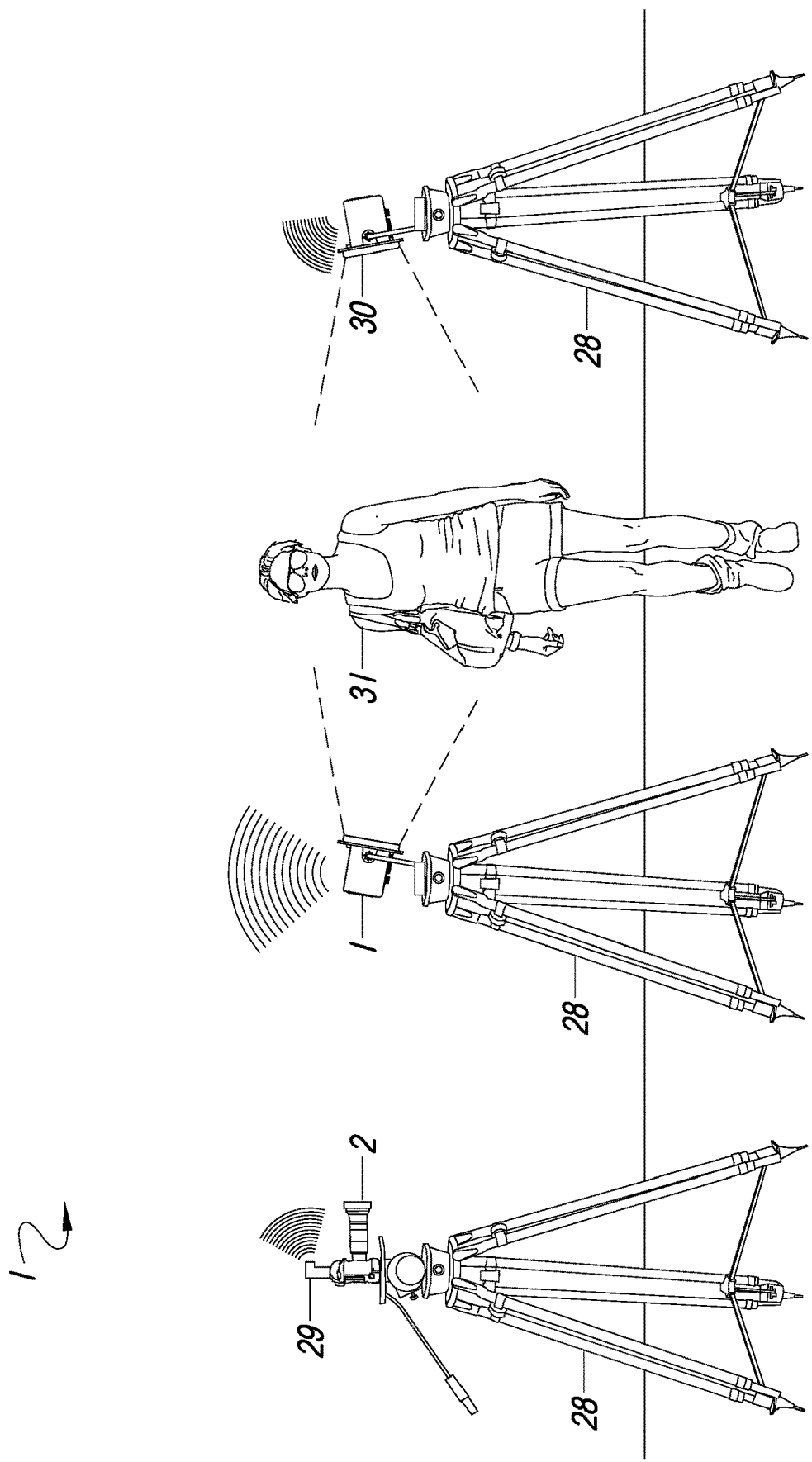
FIG. 6 is a perspective view of the invention with camera transmitter and satellite lamps.

Other aspects of the present invention shall be more readily understood when considered in conjunction with the accompanying drawings, and the following detailed description, neither of which should be considered limiting.

DETAILED DESCRIPTION OF FIGURES

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

FIG. 1 showing a perspective view of the invention comprised of a cube-shaped master unit 1 having an outer housing 3 constructed of a rigid material such as plastic, metal and the like. One end of said outer housing 3 having a touch screen 2 affixed flush to the surface and comprised of a graphical user interface and being connected to the invention's microprocessor. A front side of said outer housing 3 also having a plurality of rectangular apertures with protruding fins called cooling grill 32. Another end of said invention having a cylindrical member 8 spanning the width of master unit 1 and configured to receive a multitude of light modifier attachments. FIG. 1 also showing camera remote 29 comprised of a rectangular-shaped device being made of a rigid material such as plastic or metal with one end having a hot shoe connection capable of being selectively affixed to a conventional camera hot shoe coupling. Said remote 29 having an internal microcontroller capable of obtaining and transmitting a multitude of camera settings and functions such as, but not limited to, shutter speed, ISO, aperture and the like by means of existing SYNC or GEN-LOCK standard transference methods and sending said camera data to master unit 1 by means of an onboard 2.4 GHz transmitter.

FIG. 2 showing a front view of the aforementioned invention master unit 1 having a power supply adaptor 4, a universal serial bus adaptor 6, and a wired trigger connection 5 configured proximally on a side. Said power supply adaptor 4 being connected to the microprocessor 13 and light emitting diode (LED) 7.

FIG. 3 showing a bottom view of the invention having cylindrical member 8 having a cylindrical inset adapted to receive LED 7 by means of screws therein. Said cylindrical member 8 also having at least three slots arranged in a radial fashion proximal to said unit 1 and disposed to receive a multitude of lighting attachments as mentioned.

FIG. 4 showing a side view of the invention and having at least one stand mount 9 comprised of a square aperture and another circular aperture inside configured perpendicular to the longitudinal axis of unit housing 1 and disposed to receive a variety of tripod mounting brackets allowing said unit one to tilt at various angles.

FIG. 5 illustrating a section view of the invention with microprocessor 13 being affixed proximally to the internal portion of cylindrical member 8. Another end of said microprocessor 13 having cooling fan 11 and heat sink 12 affixed to it by means of at least four screws mounted perpendicular to its longitudinal axis. The aforementioned microprocessor 13 comprised of a bus-width architecture and may consist of, but not limited to, a microcontroller or programmable logic controller and the like. Said micropro processor also having: an onboard radio receiver and transmitter, internal random access memory and proprietary firmware. The aforementioned software and processor contained within master unit 1 utilizing data sent to onboard radio receiver from camera remote 29, as well as potential lighting information obtained from other lamps having the ability to transfer data via radio transmitters (as shown in FIG. 6).

Algorithms in software inside said microprocessor of master unit 1 utilizing said data to determine several lighting conditions—including but not limited to, appropriate flash duration, flash power, and other settings potentially relevant to the exposure of an image. In another embodiment, master unit 1 also having the capability to send lighting adjustment information by means of radio frequency to other compatible lamps 30 in FIG. 6 as part of a desired light composition using said touch screen 2 (to be discussed in a later section) in order to shape overall light output and modify light parameters on a scene.

The aforementioned software in master unit 1 having an algorithm with the capability to control lighting sequences and enhance camera bracketing. Said algorithm sends commands using fast radio frequencies to internal 7 and external LED lamps 30 to control light levels instantaneously allowing for bracketing to take place as quickly as a camera can take sequential images. For example, when a user with a camera having an ability to take 10 images per second attempts a bracketing image, a five-image sequence will be completed in half a second, dramatically increasing the chance of success for a bracketed composition by limiting motion blur between images and preventing artifacts from contaminating the images.

The aforementioned software in master unit 1 having an algorithm with the capability to send commands to said internal LED 7 and external LED lamps 30 and provides a constant pre-flash upon requested preset in the touch screen 24 in FIG. 7 (to be discussed later in this document) based on the user's preferences. Said software feature eliminating the delay in the shutter opening process present during conventional digital cameras. In another embodiment, said constant pre-flash function may allows for an image preview inside a compatible camera before an image is recorded.

FIG. 6. illustrating an embodiment whereby master unit 1 interacting with compatible lamp 30 and said camera remote 29 selectively affixed to a conventional camera with hot shoe adaptor 2. FIG. 6. also showing conventional tripod 28 selectively affixed to said master unit 1's stand mount 9 holding said unit 1 at a preselected angle.

Figure 7:
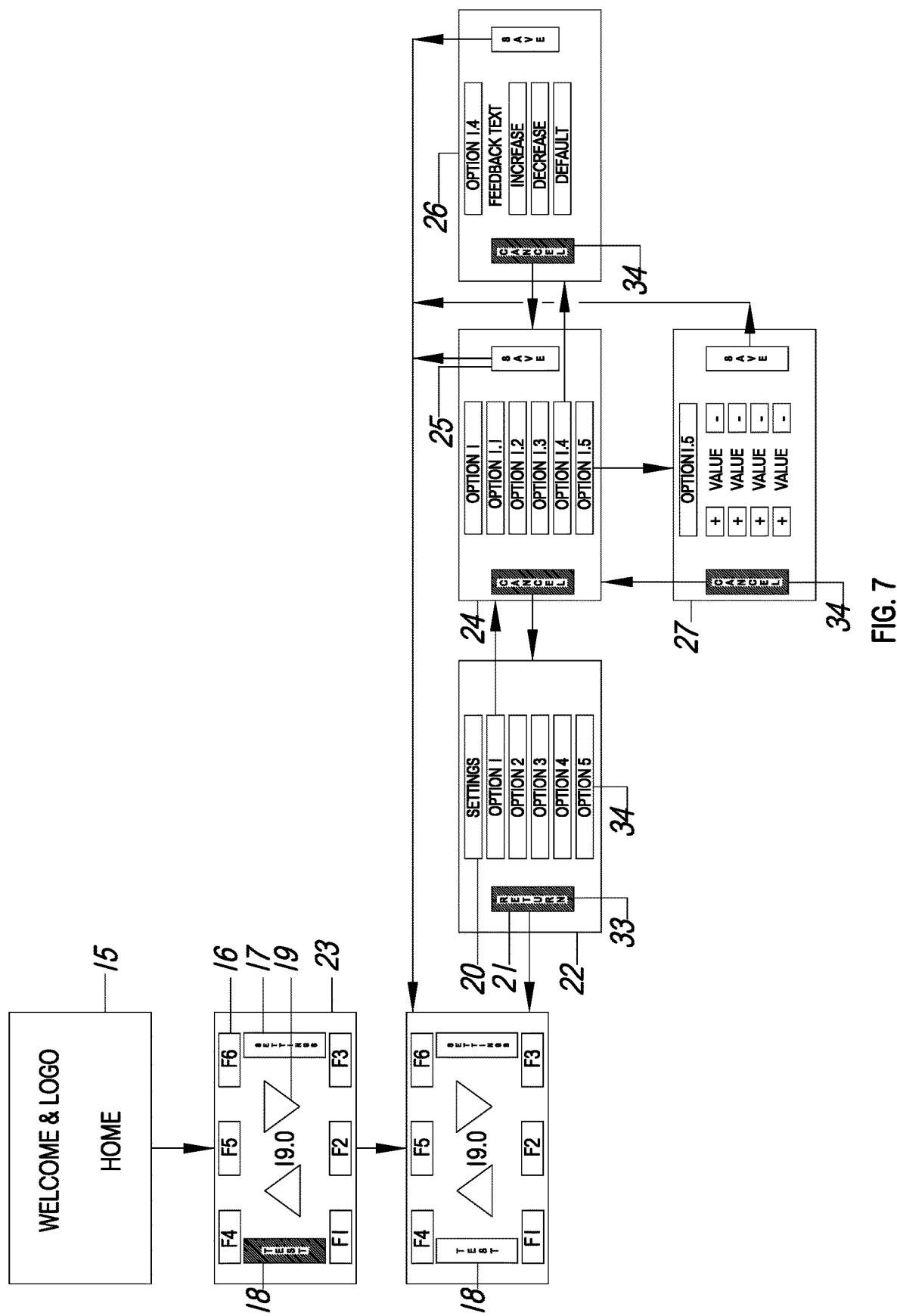
FIG. 7 is a diagrammatic view of the invention's touch screen interface.

FIG. 7 depicting the various screens of the aforementioned touch screen 2 with an initial welcome screen 15. Once said master unit 1 initializes properly, main screen 23 being presented to a user. Said proper initialization and a state of being ready confirmed by TEST bar 18 changing from the color red to the color green. Main screen 23 having a plurality of function buttons (F1, F2, etc.) 16 allowing a user to program various lighting and camera commands (such as but not limited to hue, intensity, shutter speeds etc.) and to jump to other screens. Main screen 23 also having settings buttons 17 (also having a plurality of customizable functions similar to said function buttons) allowing a user to arrive at setting screen 22 having a plurality of lighting setting options 33. Said option buttons allowing a user to enter submenu option screens 24, 26 and 27. Said subscreens 24, 26 and 27 once again, having user-defined functions as well as having cancel buttons 34 allowing a setting to be abandoned and allowing the user to return to a previous screen. Said subscreens 24, 26 and 27 also having save buttons allowing a user to save a setting to said onboard memory and returning them to main screen 18.

It is additionally noted and anticipated that although the device is shown in its most simple form, various components and aspects of the device may be differently shaped or slightly modified when forming the invention herein. As such those skilled in the art will appreciate the descriptions and depictions set forth in this disclosure or merely meant to portray examples of preferred modes within the overall scope and intent of the invention, and are not to be considered limiting in any manner. While all of the fundamental characteristics and features of the invention have been shown and described herein, with reference to particular embodiments thereof a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention.

What is claimed is:

1. A photographic light emitting diode (LED)-based lamp system for illuminating a subject, the photographic LED-based lamp system comprising:
    a master LED lamp; and
    one or more external LED lamps;
    wherein the master LED lamp comprises
        an onboard computer comprising an internal memory;
        software;
        a touch screen interface; and
        a wireless transmitter;
    wherein the master LED lamp interacts with and controls the one or more external LED lamps, a remote camera-mounted LED-based flash, and a camera simultaneously;
    wherein each of the one or more external LED lamps comprises
        an onboard microcontroller comprising
            a wireless receiver to receive a plurality of commands from the master LED lamp so that each of the one or more external LED lamps is controlled by the master LED lamp;
    wherein the master LED lamp controls a respective range, a respective intensity, a respective power level, and a respective light pattern through a respective intensity modulation for each of the master LED lamp, the remote camera-mounted LED-based flash, and the one or more external LED lamps without first obtaining exposure or pre-flash information from the camera; and
    wherein the master LED lamp controls number of images taken, pre-flashes, a shutter speed, ISO sensitivity, lens metering, an aperture, and a bracketing of the camera without first obtaining the exposure or the pre-flash information from the camera.

2. The photographic LED-based lamp system of claim 1, wherein the remote camera-mounted LED-based flash comprises
    a microcontroller; and
    a wireless transmitter.

3. The photographic LED-based lamp system of claim 1, wherein the master LED lamp further comprises:
    an outer housing comprising
        a plurality of apertures;
    a plurality of cooling grills extending through the plurality of apertures of the outer housing;
    a power supply adaptor attached to a side surface of the outer housing; and
    an LED.

4. The photographic LED-based lamp system of claim 3, wherein the master LED lamp further comprises:
    a universal serial bus adaptor on a side surface of the outer housing; and
    a wired trigger connection on the side surface of the outer housing.

5. The photographic LED-based lamp system of claim 1, wherein the master LED lamp further comprises:
    one or more stand mounts configured to receive one or more mounting brackets of a tripod.

6. The photographic LED-based lamp system of claim 1, wherein the master LED lamp further comprises:
    an LED;
    a cylindrical member comprising
        a cylindrical inset adapted to receive the LED.

7. The photographic LED-based lamp system of claim 1, wherein the master LED lamp further comprises
    a cooling fan attached to the onboard computer; and
    a heat sink attached to the onboard computer.

* * * * *